United States Patent [19]
Kamen et al.

[11] Patent Number: 5,522,568
[45] Date of Patent: Jun. 4, 1996

[54] POSITION STICK WITH AUTOMATIC TRIM CONTROL

[75] Inventors: Dean L. Kamen, Bedford; Bradley D. Miller, Londonderry, both of N.H.

[73] Assignee: DEKA Products Limited Partnership, Manchester, N.H.

[21] Appl. No.: 150,711

[22] Filed: Nov. 9, 1993

[51] Int. Cl.[6] .................................................. B64C 27/54
[52] U.S. Cl. ..................... 244/17.13; 244/229; 244/236; 244/178
[58] Field of Search .................... 244/220, 223, 244/225, 228, 229, 236, 17.13, 237, 178

[56] References Cited

U.S. PATENT DOCUMENTS

| | | | |
|---|---|---|---|
| 3,173,631 | 3/1965 | Hendrickson | 244/236 |
| 3,447,766 | 6/1969 | Palfreyman | 244/236 |
| 3,700,995 | 10/1972 | Parkinson et al. | 318/628 |
| 4,109,886 | 8/1978 | Tribken et al. | 244/178 |
| 4,150,803 | 4/1979 | Fernandez | 244/236 |
| 4,383,299 | 5/1983 | Fischer et al. | 364/434 |
| 4,392,203 | 7/1983 | Fischer et al. | 364/434 |
| 4,420,808 | 12/1983 | Diamond et al. | 364/434 |
| 4,492,907 | 1/1985 | Fabian et al. | 318/586 |
| 4,531,080 | 7/1985 | Nordstrom et al. | 244/236 |
| 4,603,388 | 7/1986 | Griffith et al. | 364/433 |
| 4,607,202 | 8/1986 | Koenig | 244/223 |
| 4,626,998 | 12/1986 | Adams et al. | 364/434 |
| 4,628,455 | 12/1986 | Skutecki | 364/434 |
| 4,696,445 | 9/1987 | Wright et al. | 244/229 |
| 5,012,423 | 4/1991 | Osder | 364/432 |
| 5,076,517 | 12/1991 | Ferranti et al. | 244/223 |
| 5,125,602 | 6/1992 | Vauvelle | 244/237 |
| 5,142,931 | 9/1992 | Menahem | 244/236 |
| 5,149,023 | 9/1992 | Sakurai et al. | 244/236 |
| 5,156,363 | 10/1992 | Cizewski et al. | 244/236 |
| 5,178,307 | 1/1993 | Wright et al. | 244/17.13 |
| 5,264,768 | 11/1993 | Gregory et al. | 244/236 |

*Primary Examiner*—Galen L. Barefoot
*Attorney, Agent, or Firm*—Bromberg & Sunstein

[57] ABSTRACT

Automatic trim control for a position stick. Strain gauges are mounted with respect to the position stick so as to generate signals proportional to the force manually exerted upon the control stick. The signals from the strain gauges are used to control trim motors which adjust force exerted by springs on the position stick in opposition to the manual force. The signals from the strain gauges are used to control the trim motors so as to reduce the force of the trim springs opposing the manual force. The trim springs are adjusted to reduce the opposition force to a minimum.

15 Claims, 5 Drawing Sheets

POSITION STICK WITH AUTOMATIC TRIM CONTROL

BACKGROUND OF THE INVENTION

This invention relates to an improved control stick for aircraft, and in particular, an automatic trim control system for a cyclic control stick in a helicopter. Helicopters controlled by a cyclic stick often use trim springs to center the stick giving it a no-force position. Typically, the control stick is provided with a cooly-hat switch for adjusting the trim springs to change the no-force position. The cooly-hat switch is comprised of four (4) individual switches, each for controlling one of the 90 degree directions relative to the line of flight. When a cyclic stick is moved by the pilot to a particular position for controlling the helicopter, force is exerted to hold the stick in position. The pilot's thumb can be used to direct the cooly-hat switch to adjust the trim springs for any of the 0, 90, 180 or 270 degree directions. After using the switches controlled by the cooly-hat to achieve proper adjustment, the pilot may then stop applying force to the cyclic stick and yet maintain the present control orientation on the helicopter. The cooly-hat switch is thus used by the pilots to reduce the amount of effort needed to control the helicopter.

SUMMARY OF THE INVENTION

The present invention is directed to a system for automatically controlling the trim springs connected to the cyclic control stick to reduce the amount of force needed to fly the aircraft. The trim springs are automatically adjusted in all directions to reduce the force required by the pilot as the cyclic control stick is moved.

A strain gauge bridge is mounted relative to the cyclic stick, at least one for each directional component controlled by the stick. Typically, the cyclic control stick controls a lateral and a longitudinal directional component. The strain gauges generate signals proportional to the force exerted on the cyclic stick to achieve a signal in each of the directional components controlled by the stick. The cyclic stick is mechanically coupled to mechanical control linkages one for each directional component controlled by the stick. There is a trim motor for each directional component controlled by the stick. The signals generated by the strain gauges are used to determine control signals that are directed to the trim motors to change the amount of force exerted by the springs on the cyclic stick. The control signals are processed so that the force exerted by the springs in opposition to the effort exerted by the pilot is reduced to a minimum.

The present invention advantageously adapts a position stick such as a cyclic control stick, to provide force signals that can be used to automatically adjust the trim springs and change the no-force position as the pilot controls the aircraft. Other objects and advantages of the invention shall become apparent during the description of the preferred embodiment taken in conjunction with the drawings.

DETAILED DESCRIPTION OF THE PREFERRED EMBODIMENT

Figure 1:
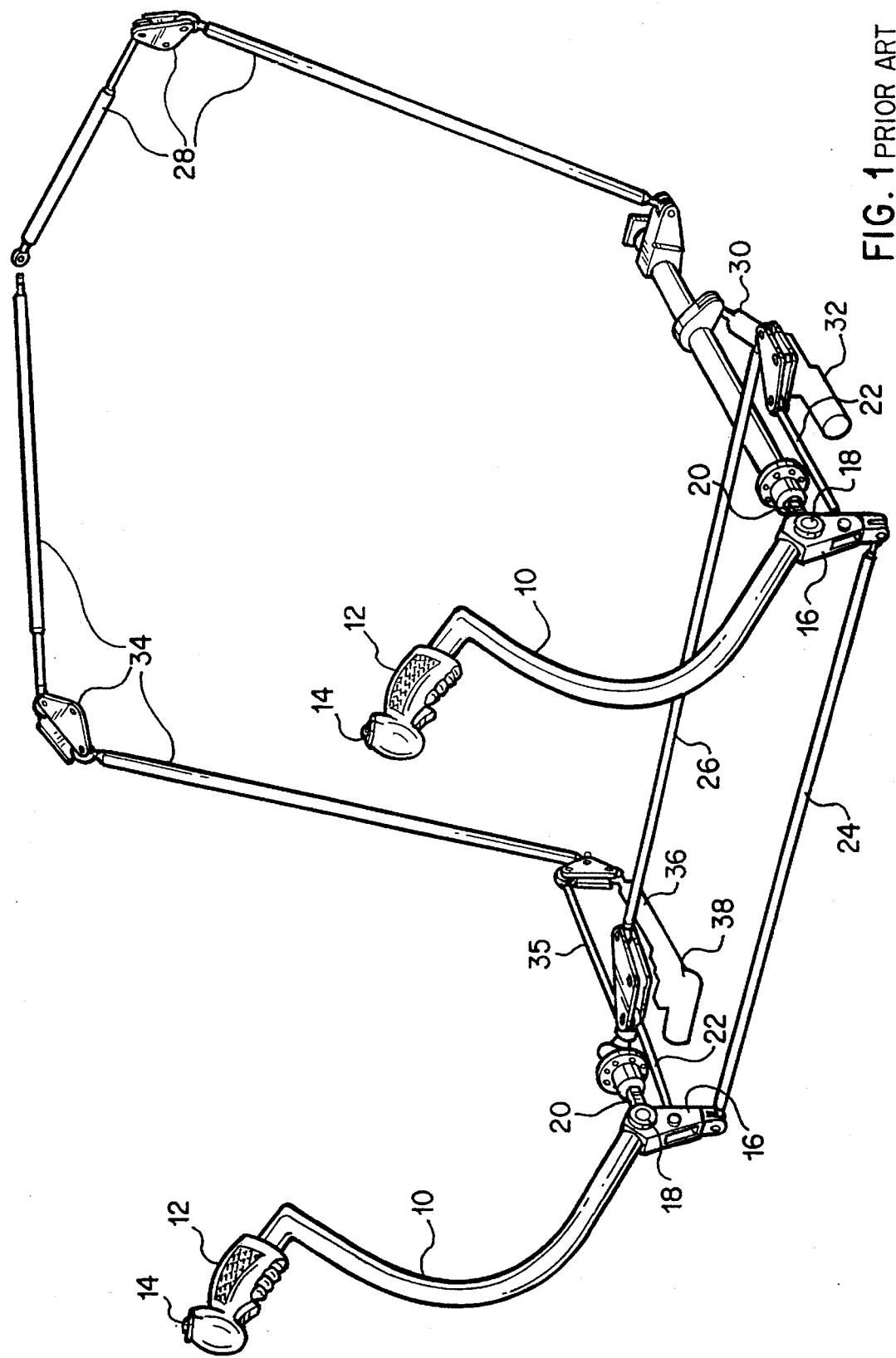
FIG. 1 is a mechanical schematic diagram of a prior art mechanical system controlled by a cyclic control stick.

Referring now to the drawings, FIG. 1 illustrates the mechanical system of the prior art operated by a cyclic control stick. A cyclic control stick 10 is provided in duplicate, one fop the pilot and one for the co-pilot. The two cyclic sticks are connected together so that movement of one results in identical movement of the other. Each cyclic stick 10 is provided with a hand grip 12. On top of the hand grip is a cooly-hat switch 14. The cyclic sticks 10 are fixed to a pivot fitting 16. The conventional cyclic stick is provided for controlling two separate mechanical linkages. The pivot fitting 16 is thus pivotable about two axes. The pivot fitting 16 is mounted at a pivot point to a rotatable rod 20. Rotation about the axis of the rod 20 is accomplished by the pilot pushing the cyclic stick to the right or left. The rotatable rod 20 is thus used in the lateral control linkage. A bolt 18 attaches the pivot rod 16 to the rotatable rod 20. The bolt 18 provides another axis of rotation about which the pivot rod 16 pivots when the pilot pulls backward or pushes forward on the cyclic stick. This axis of rotation is thus used in the longitudinal control.

A lateral connector rod 24 connects the pilot and co-pilot cyclic control sticks to maintain the lateral control exerted by either the pilot or co-pilot identical. The rotatable rod 20 provides the mechanical coupling between the cyclic control Stick and a lateral control linkage 28 consisting of a series of poles and swivel hinges. The lateral control linkage 28 leads to a helicopter's rotors for controlling sideways movements of the craft. Trim springs 30 attached to the rotatable rod 20 are controlled by a lateral trim motor 32. The lateral trim motor in the prior art was operated in response to thumb pressure against the cooly-hat switch 14.

A longitudinal control input generated by pulling or pushing on the cyclic stick gets mechanically transmitted by the pivot rod 16 through a pull rod 22. A longitudinal connector rod 26 connects the two cyclic sticks so that they operate identically along the longitudinal directional component. A series of rods and hinges form the longitudinal mechanical control linkage 34. A pull rod 35 provide the mechanical coupling between the cyclic control stick and the longitudinal control linkage 34. The pull rod 35 connects to the pull rod 22 operated by the cyclic stick and connects to the coupling between the two cyclic sticks. Trim springs 36 are attached to the longitudinal mechanical coupling between the pull rod 35 and the longitudinal control linkage 34. A longitudinal trim motor 38 serves to adjust the trim springs 36.

The cyclic stick thus provides two directional inputs, lateral and longitudinal, to the mechanical couplings and linkages. Rotation about the rotatable rod 20 axis provides the lateral linkage control input. Back and forth pivoting about the bolt 18 provides the longitudinal linkage control input. Position sticks with differently arranged control inputs may also be used in conjunction with the present invention to obtain the same advantages of automatic trim control.

The cooly-hat switch of the prior art can be pushed by the pilot or co-pilot in either a forward, backward, left or right direction. In this manner, signals are sent to a trim motor to adjust the trim springs on the longitudinal or lateral mechanical couplings. The pilot or co-pilot operates the cooly-hat switch until the no-force position of the stick is in the desired location.

Figure 2:
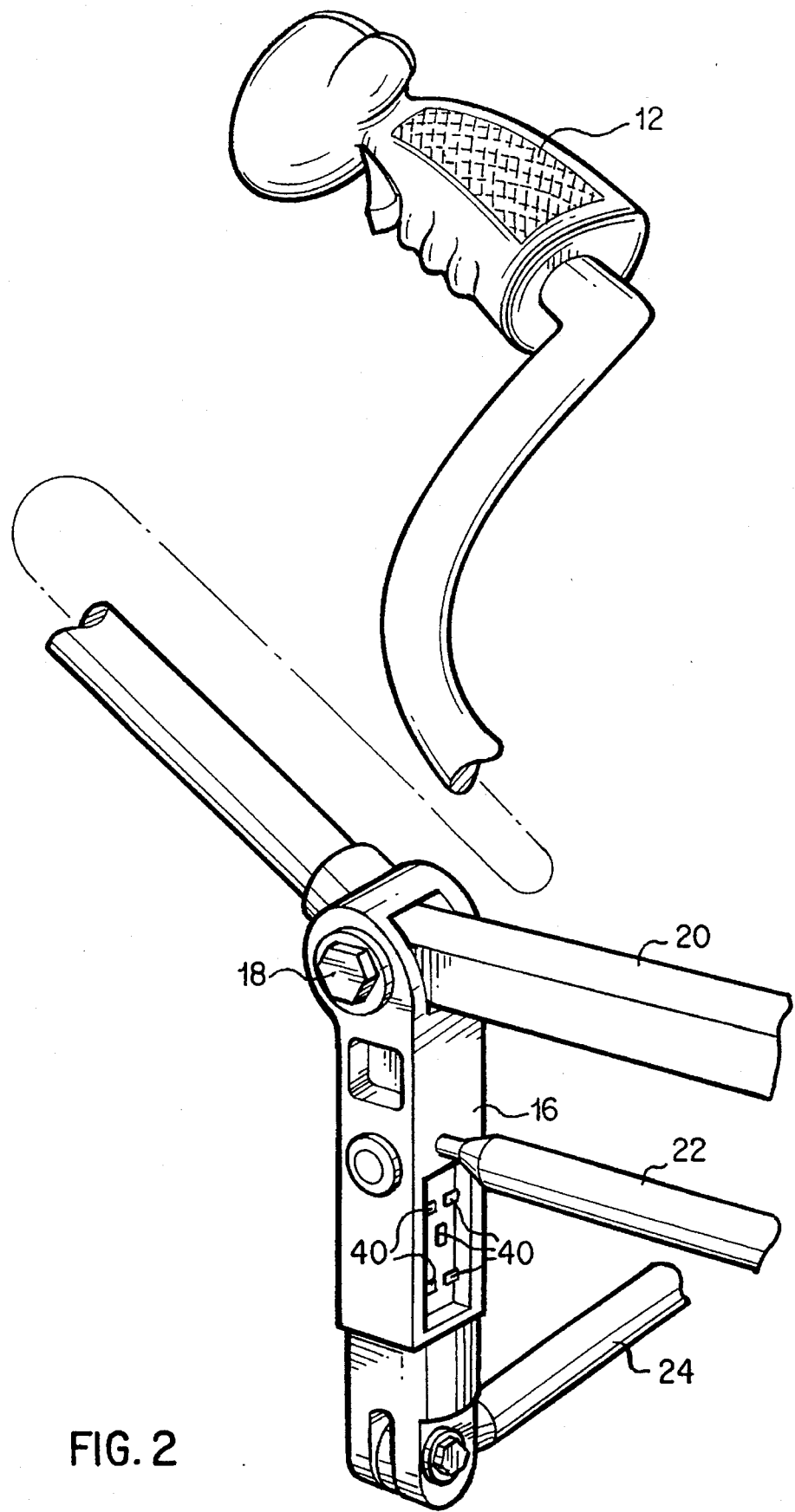
FIG. 2 is a perspective drawing of the cyclic control stick of the present invention.

Referring now to FIG. 2, the cyclic control stick of the present invention is shown. In accordance with the present invention, strain gauges 40 are mounted with respect to the control stick 10, so as to detect force exerted by the pilot or co-pilot on the cyclic control stick 10 along the directional components controlled by the stick. The strain gauges are mounted on a surface machined into the pivot fitting 16 that is oriented for sensitivity to force on the cyclic stick along the lateral and longitudinal directional components. More particularly, in order to detect force exerted to cause rotation of the cyclic stick about the rotatable rod 20, the strain gauges 40 provide a lateral strain gauge bridge. In order to detect force exerted to cause axial movement of pull rod 22, the strain gauges 40 provide a longitudinal strain gauge bridge. The strain gauges may be conventional resistance foil strain gauges. The gauges are bonded to the pivot fitting with an adhesive. The strain gauges 40 are preferably mounted on the pivot fitting 16 so as to maximize the signals generated by the strain gauges 40 in response to a pilot applied force. However, because the cyclic stick 10 and the pivot fitting 16 are fixed to one another the strain gauges can be placed on either one to obtain the measure of the force applied to the cyclic stick 10. It is generally sufficient to mount the strain gauges only on the pivot fitting 16 of the pilot's-stick, but gauges may be mounted on the co-pilot's cyclic stick or fitting as well.

Figure 3:
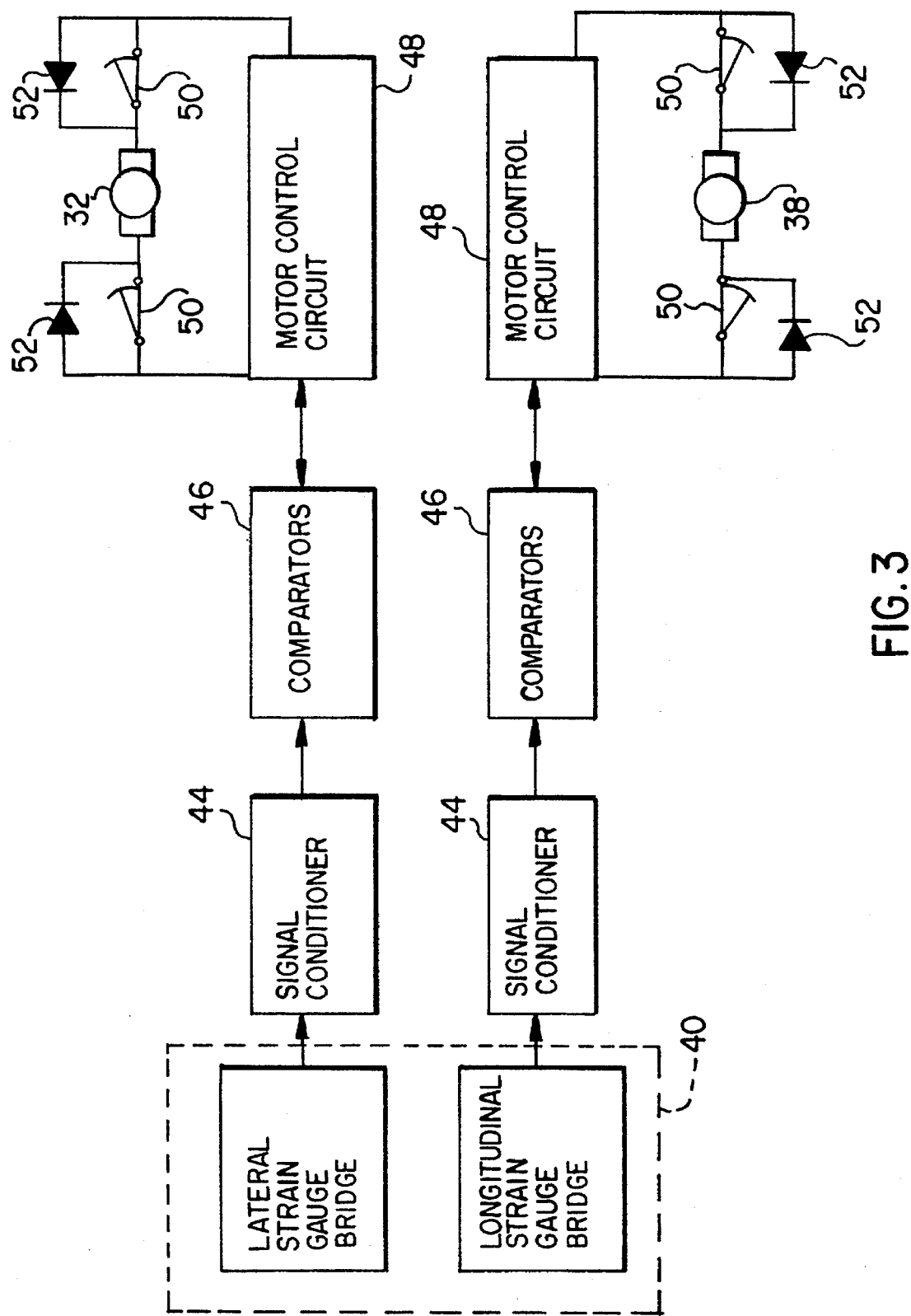
FIG. 3 is an electrical block diagram of the automatic trim control system of the present invention.

The signals from the strain gauges are processed by the circuitry illustrated in diagram form in FIG. 3. The circuitry determines control signals to be directed to the respective trim motors so as to reduce the amount of opposition force exerted by the trim springs on the cyclic stick to a minimum. Each strain gauge bridge relates to a different directional input on the cyclic stick. The signals from the strain gauge bridges are handled separately for each strain gauge bridge. Advantageously, the signals for each directional component, lateral and longitudinal, are handled simultaneously. Thus, the trim springs are adjusted at the same time rather than sequentially as with the conventional cooly-hat switch.

The strain gauge signals are first delivered to a signal conditioner 44. The presently preferred signal conditioner is a 1B31AN made by Analog Devices of Norwood, Mass. The signal conditioner amplifies the signals and produces an output signal linearly related to the force applied to the cyclic stick. The linear relationship is maintained over at least a minimal range of force. For example, the linearity may be maintained for forces between 0 and 30 lbs. of force along a directional component in both the first direction and its opposite direction. The output of the signal conditioner for such an input will typically be between zero and ten volts centered around five volts for the no force condition. The output from each signal conditioner is fed into comparators 46. Hysteresis is added to the comparators 46 to keep their outputs from turning on and off with the same voltage on the inputs. If the output from the signal conditioner 44 is about 5 volts, the hysteresis comparators will issue an output which leaves the trim motor being controlled in an off condition. The hysteresis on the comparators 46 can be adjusted to provide a range encompassing the 5 volt level in which the off signal is sent to the motor control circuit 48. Above an upper threshold, an output signal is sent from the comparators 46 to a motor control circuit 48 to move the respective trim motor in a first direction. If the signal from the signal conditioner is below a lower threshold, a signal will be sent to the motor control circuit 48 to drive the respective trim motor in a direction opposite to the first direction. The motor control circuit 48 is responsive to the signals from the hysteresis comparators to drive the trim motor in a positive or negative direction. When a trim motor has driven the trim springs to a limit in either of the directions, the respective limit switch 50 is tripped to prevent any further control signals from driving the trim motor in the direction in which the limit has been reached. Diodes 52 are provided across each limit switch so that once a limit switch has been tripped a circuit path remains available for driving the trim motor in the opposite direction to take it out from the limit that has been reached. When the trim motor has been pulled off its limit, the limit switch enclosed in the normal circuit is resumed.

Figure 4A:
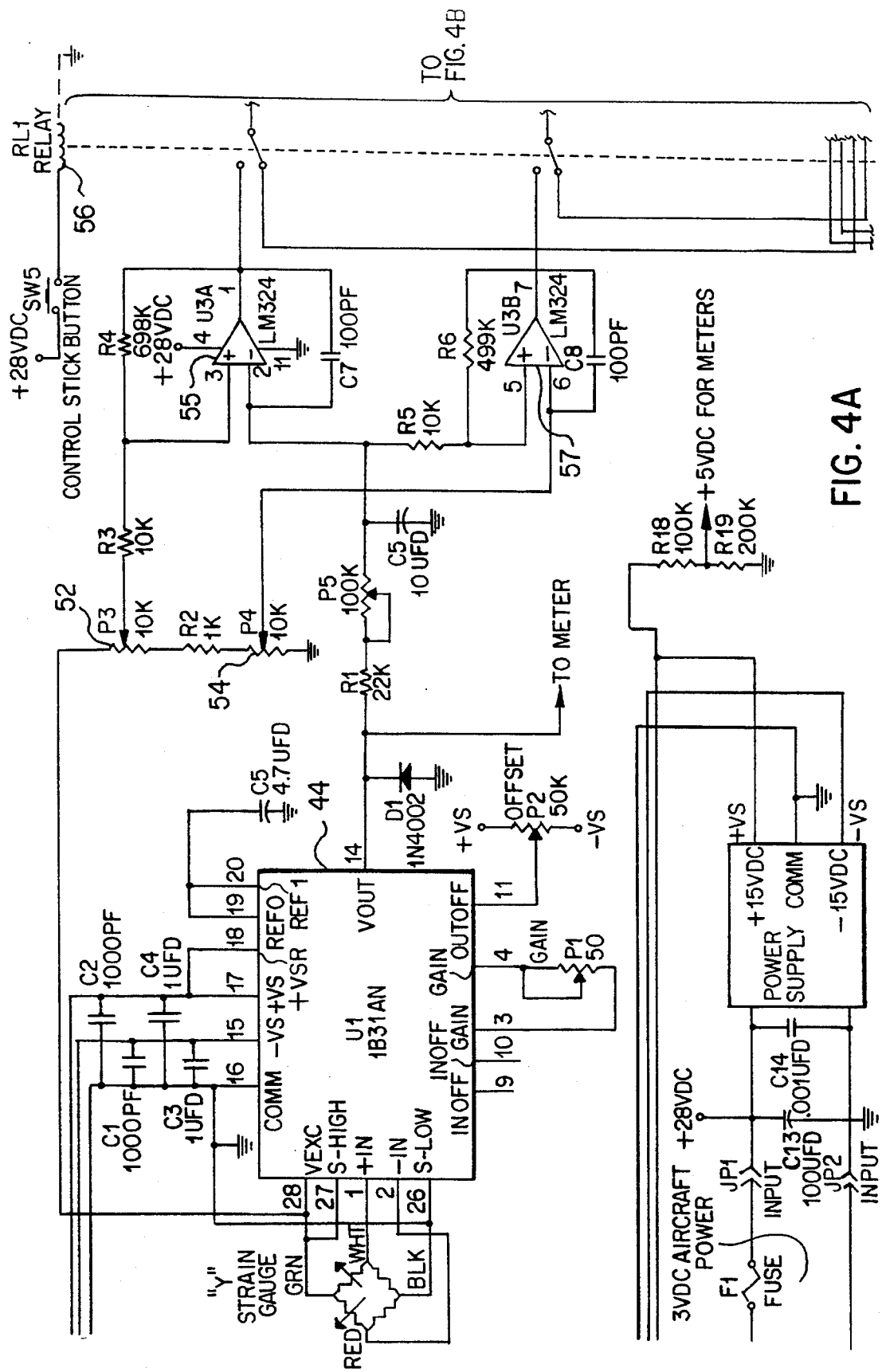
FIGS. 4a and 4b is an electrical schematic of the electrical system for one of the directional components controlled in FIG. 3.
Figure 4B:
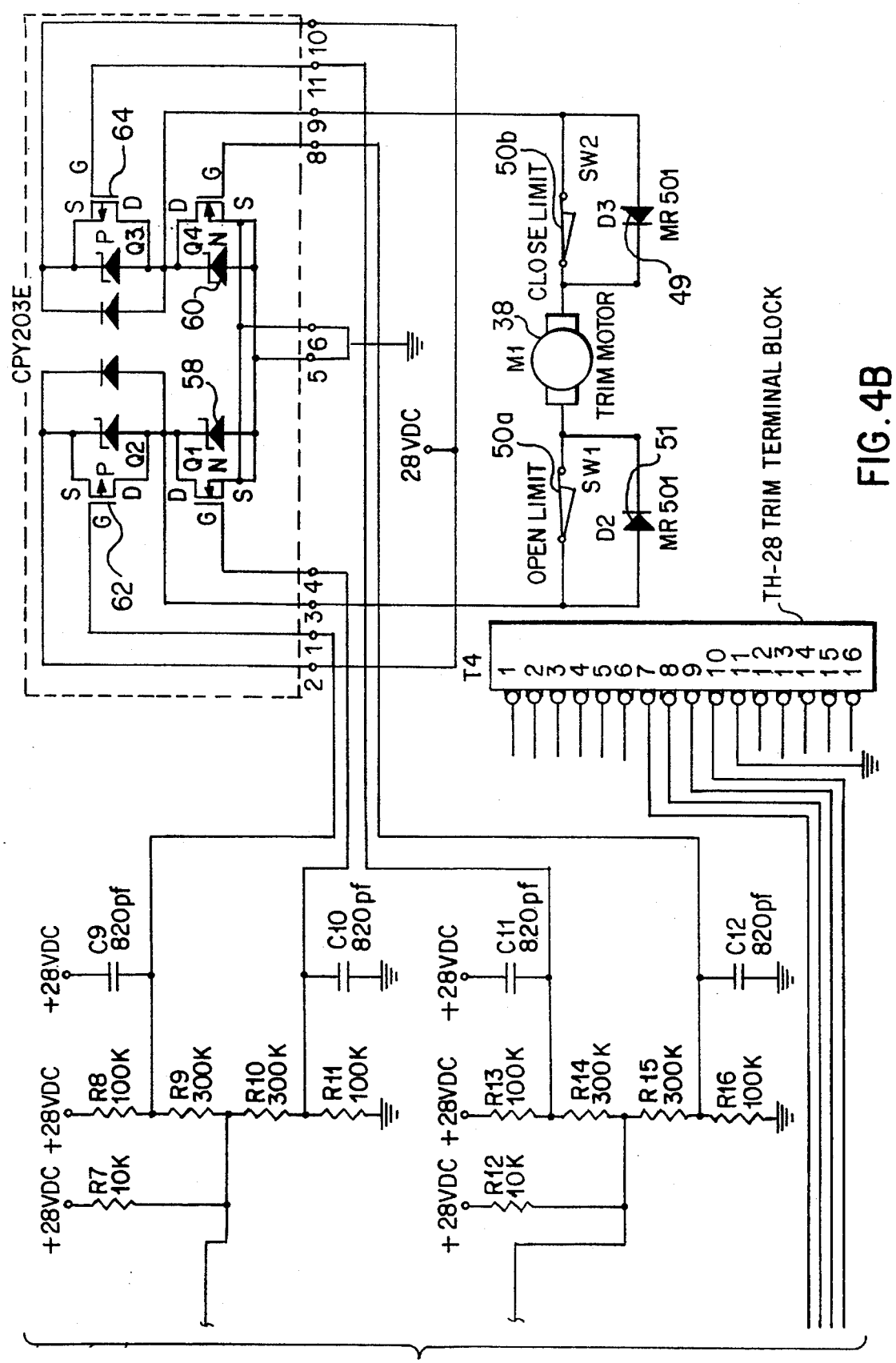

FIG. 4 is an electrical schematic for controlling the longitudinal trim motor 38. An identical circuit is used for the control of the lateral trim motor 32. The longitudinal strain gauge bridge is shown as the input to the circuit. The signal conditioner 44 is a 1831AN as described above. The comparators 46 include a pair of op amps. The presently preferred op amps are the LM324. manufactured by National Semiconductor of Santa Clara, Calif. An upper threshold, potentiometer 52 is inserted in a voltage divider to set the upper threshold above which the trim motor will be operated in a first direction. A lower threshold potentiometer 54 is also mounted on the voltage divider to set a lower threshold below which the trim motor will be operated in a direction opposite to the first direction. The output from the signal conditioner 44 is provided to both of the op amps where it is individually compared to the upper and lower thresholds. If the upper threshold amplifier 55 is on, the lower threshold amplifier 57 will be off. If the lower threshold amplifier 57 is on, the upper threshold amplifier 55 will be off. When the voltage from the signal conditioner is about 5 volts, both amps will be off.

The automatic trim control system of the present invention can be mounted on an existing cooly-hat control system so that the pilot may be given the option to select the manual cooly-hat control or the automatic trim control system. A relay 56 operated by the pilot selects either automatic trim control or the cooly-hat control.

The outputs from the op amps are provided to a voltage divider network which provide inputs to an FET H bridge. The FET H bridge of the presently preferred embodiment is a CPY203E manufactured by International Rectifier of El Segundo, Calif. The FET H bridge includes a first sink transistor 58 and a second sink transistor 60. When the output of the signal conditioner is about 5 volts, the output of the op amps forming the hysteresis comparators 46 are both zero thereby shutting off both of the sink transistors 58 and 60 and shutting off operation of the trim motor 38. The FET H bridge further includes a source transistor 62 and a second source transistor 64. With the upper threshold op amp issuing a high signal and the lower threshold op amp issuing a low signal, the second source transistor 64 and the first sink transistor 58 are on while the other two transistors are off. Conversely, with the first op amp off and the second op amp high, the first source transistor 62 and the second sink transistor 60 are both on while the other two transistors are off. Each of these control conditions operate the trim motor in opposite directions.

When the longitudinal trim spring 36 reaches the limit of its open position, the limit switch 50a is opened. In order that the switch may be closed when a signal is received to reverse the trim motor 38 a circuit can be established through the diode 51. The limit switch 50a will be closed when the trim spring closes past its open limit. The operation is the same in the opposite direction using the close limit switch 50*b* and the diode 49. The resistor divider network and the FET H bridge of the present invention may advantageously be used with the cooly-hat switch. This electronic circuit of the present invention is advantageously much lighter than the 6 heavy relays that are in the prior art cooly-hat control system.

Of course, it should be understood that various other changes and modifications of the preferred embodiments described above will be apparent to those skilled in the art. For example, the cyclic stick may control more than two directional inputs. Different position stick arrangements are possible for use with the present invention in which additional other directional components are possible including but not limited to up- down, left- right, front-back, clockwise-counterclockwise, etc. These and other changes can be made without departing from the spirit and the scope of the invention and without diminishing its attendant advantages. It is therefore intended that such changes and modifications be covered by the following claims.

We claim:

1. An automatic trim control system for a manually repositionable position stick comprising:

trim means for establishing a no-force position for said position stick;

a trim motor connected to said trim means for adjusting the no-force position along one directional component;

a strain gage bridge mounted relative to said position stick such that said strain gage bridge generates signals proportional to force exerted on said position stick caused by manual repositioning of said position stick along the one directional component; and means for processing the signals generated by said strain gages to determine control signals to be directed to said trim motor to move the no-force position of said position stick along the one directional component in accordance with the manual repositioning of said position stick.

2. The automatic trim control system of claim 1 wherein said trim means comprises a trim spring.

3. The automatic trim control system of claim 1 further comprising a limit switch connected to said trim means and said trim motor and a diode electrically connected in parallel with said limit switch, said diode allowing signals to said trim motor to operate said trim motor in a direction so as to adjust said trim means away from the limit set by said limit switch.

4. The automatic trim control system of claim 1 wherein said processing means comprises:

means for conditioning the signals from said strain gauge bridge so as to produce an output signal substantially linearly proportional to the force exerted on said position stick along the one directional component;

means for setting an upper threshold and a lower threshold and for issuing a command signal if the output signal exceeds the upper threshold or falls below the lower threshold; and means responsive to the command signal for providing power to said trim motor.

5. The automatic trim control system of claim 4 wherein said means responsive to the command signal for providing power to said trim motor comprises an FET H bridge.

6. An automatic trim control system for a position stick comprising:

trim means for establishing a no-force position for said position stick;

a first trim motor connected to said trim means for adjusting the no-force position along a first directional component;

a second trim motor connected to said trim means for adjusting the no-force position along a second directional component different from the first direction;

a first strain gauge bridge connected to said position stick to generate signals corresponding to force exerted on said position stick along the first directional component;

means for conditioning the signals from said first strain gauge bridge so as to produce a first output signal substantially linearly proportional to the force along the first directional component;

means for setting an upper threshold and a lower threshold and for issuing a command signal if the first output signal exceeds the upper threshold or falls below the lower threshold;

means responsive to the command signal for providing power to said first trim motor;

a second strain gauge bridge connected to said position stick to generate signals corresponding to force exerted on said position stick along the second directional component;

means for conditioning the signals from said second strain gauge bridge so as to produce a second output signal substantially linearly proportional to the force along the second directional component;

means for setting an upper threshold and a lower threshold and for issuing a command signal if the second output signal exceeds the upper threshold or falls below the lower threshold; and means responsive to the command signal for providing power to said second trim motor.

7. The automatic trim control system of claim 6 further comprising a limit switch connected to said trim means and said first trim motor and a diode electrically connected in parallel with said limit switch, said diode allowing signals to said first trim motor to operate said first trim motor in a direction so as to adjust said trim means away from the limit set by said limit switch.

8. The automatic trim control system of claim 6 wherein said trim means comprises lateral trim springs and longitudinal trim springs.

9. The automatic trim control system of claim 6 wherein said means responsive to the command signal for providing power to said first trim motor comprises an FET H bridge.

10. A cyclic control stick with automatic trim control comprising:

a first mechanical control linkage;

a second mechanical control linkage;

a cyclic stock, having one end with a hand grip and an opposite end, being adjustably positionable so as to mechanically reposition said first mechanical linkage and said second mechanical linkage;

a first mechanical coupling between a first directional input from said cyclic stick and said first mechanical control linkage;

a second mechanical coupling between a second directional input from said cyclic stick and said second mechanical control linkage;

strain gages mounted proximate to the opposite end of said cyclic stick such that said strain gages generate signals proportional to force exerted on said cyclic stick caused by manual repositioning of said cyclic stick along a first directional input and signals proportional to force exerted on said cyclic stick caused by manual repositioning of said cyclic stick along a second directional input;

first trim means for applying force to said first mechanical coupling so as to oppose manual repositioning of said cyclic stick along the first directional input;

second trim means for applying force to said second mechanical coupling so as to oppose manual repositioning of said cyclic stick along the second directional input;

a first trim motor for adjusting the amount of force exerted on said first mechanical coupling by said first trim means;

a second trim motor for adjusting the amount of force exerted on said second mechanical coupling by said second trim means;

means for processing the signals generated by said strain gages to determine control signals to be directed to said first trim motor and said second trim motor to reduce the amount of the opposition force exerted on said first mechanical coupling and said second mechanical coupling to a minimum.

11. The cyclic control stick of claim 10 further comprising a pivot member, fixedly attached to said cyclic stick, having two flat surfaces perpendicular to one another and wherein said strain gages are mounted on said flat surfaces.

12. The cyclic control stick of claim 10 wherein said first trim means comprises a trim spring.

13. The cyclic control stick of claim 10 further comprising an FET H bridge electrically connected between said processing means and said first trim motor.

14. The cyclic control stick of claim 10 further comprising a limit switch connected to said first trim means and said first trim motor and a diode electrically connected in parallel with said limit switch, said diode allowing signals to said first trim motor to operate said first trim motor in a direction so as to adjust said trim means away from the limit set by said limit switch.

15. The cyclic control stick of claim 10 wherein said processing means comprises means for generating a command signal if the signals from said strain gauges exceeds an upper threshold or falls below a lower threshold.

* * * * *